Patented Oct. 4, 1932

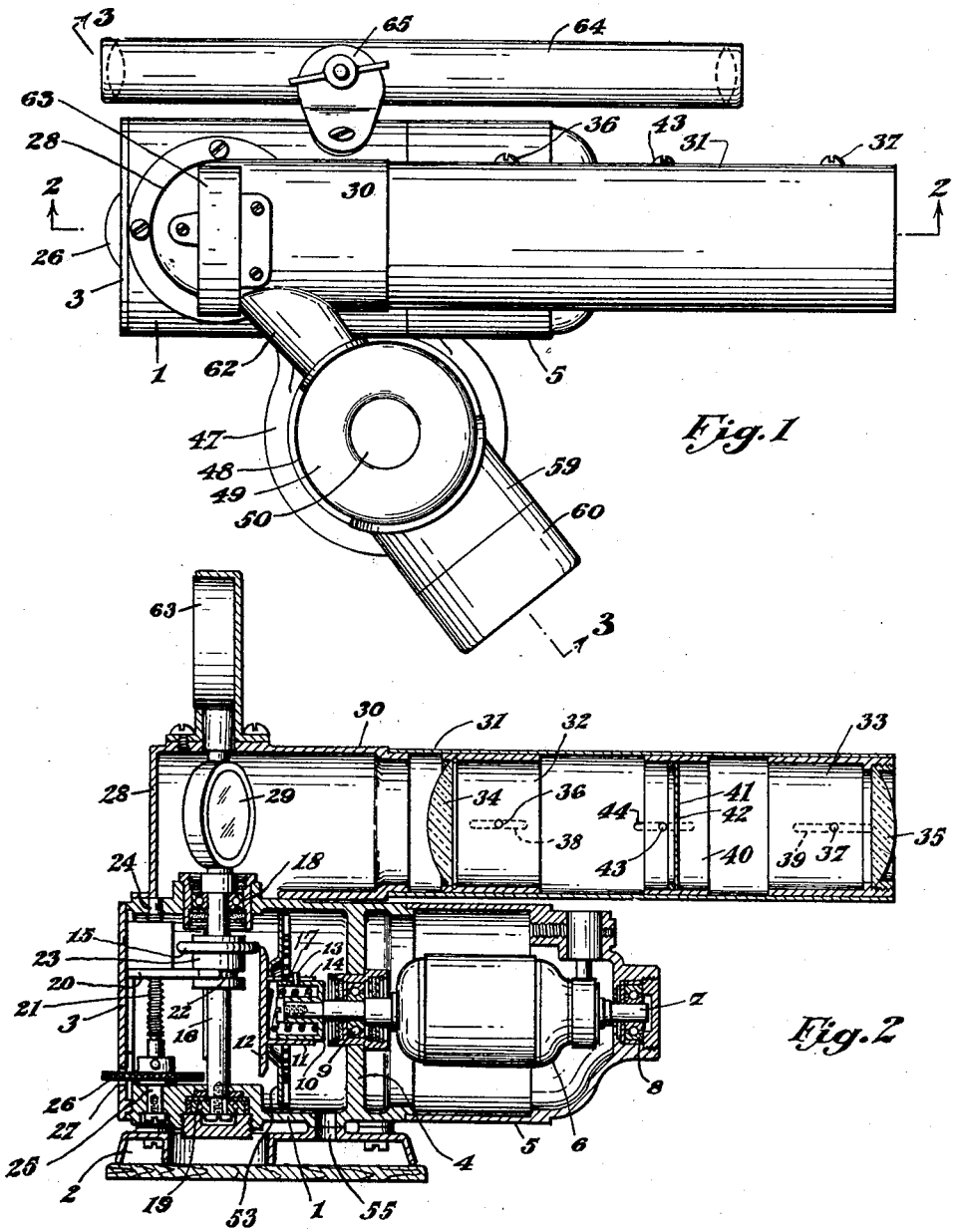

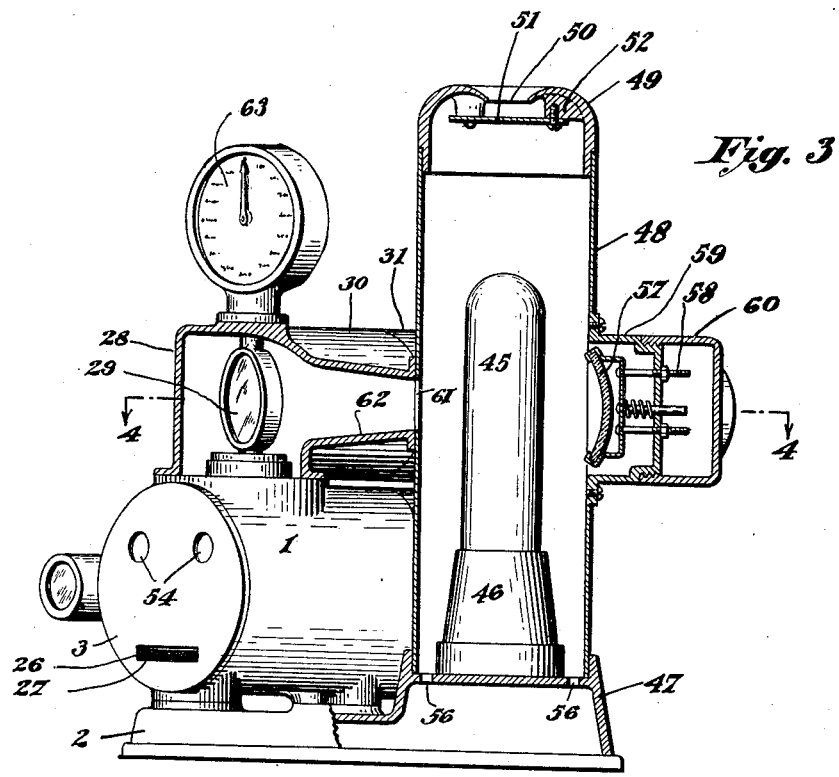
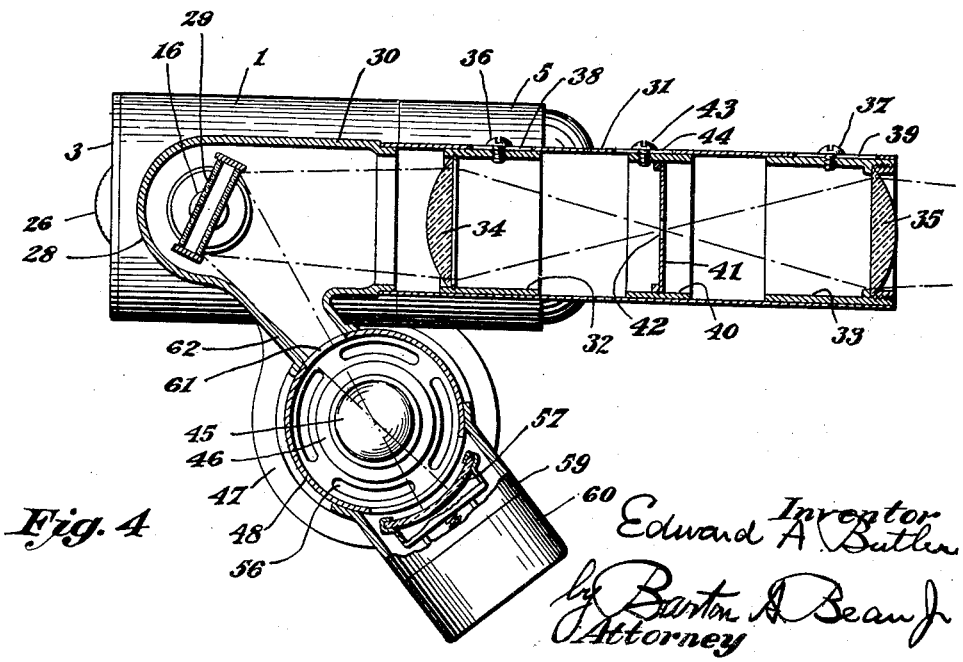

1,880,774

UNITED STATES PATENT OFFICE

EDWARD A. BUTLER, OF BUFFALO, NEW YORK, ASSIGNOR, BY MESNE ASSIGNMENTS, TO ROBERT DONNER, OF BUFFALO, NEW YORK

APPARATUS FOR OBSERVING RAPIDLY MOVING OBJECTS

Application filed October 9, 1928. Serial No. 311,363.

This invention relates to stroboscopes or devices for measuring or determining the speed of rotation or movement of moving objects and for studying the variation in movement thereof.

In devices heretofore proposed to serve the purpose of this invention, there have been provided means for illuminating the object to be observed, together with a rotating disk or the like having an aperture therein, and means for driving the disk whereby the aperture will come into registration or line with the eye of the observer with a predetermined frequency. There have also been provided devices of the so-called neon type in which generally a magneto provided with a tachometer supplies high frequency alternating current to a neon lamp, the light from which is directed upon a moving object. The speed of the magneto is regulated by means of a suitable change speed device interposed between it and the motor until the frequency of the current generated thereby and the light beam coincide with the cyclic frequency of movement of the object under observation. Under such conditions the object appears to be stationary and the rapidity of motion of the object is indicated by the tachometer.

The disadvantage of these types of structure has been lack of accuracy in the reading of the cyclic frequency offered. With respect to the first-mentioned type definite and accurate readings have been impossible at certain speeds due to the fact that an immediate and abrupt cutting off or interruption of the light beam does not take place. Furthermore, these devices have been limited in their application due to the fact that the rotating disk has one standard size opening which can be used only at certain speeds and on certain classes of work. With respect to the second class of devices, that is to say the neon type, it has been found that there is an inherent and variable error by reason of the well known physical fact that the intervals of darkness between the intervals of light are of irregular and uncertain duration at high frequencies, and inasmuch as it is essential for accuracy that both of these intervals be relatively accurate, this type of device is not reliable over a range of variable speeds.

One object of the present invention is to provide a device of the character referred to which is of relatively simple construction, readily portable and which is susceptible of ready use by the millwright and factory engineer as well as by research and more technically trained persons.

A further object is to provide a device which will be substantially universal in its application and permit of a wide variety of uses and observations such as examining shafts, gears, cams, shuttles and the like, or any body having a high cyclic frequency whether rotary, reciprocatory or oscillatory and is equally applicable in disclosing conditions of unbalance in cyclic moving masses and the points and speeds where such unbalance occurs.

Another object is to provide a variable means for indicating the results of the observation which are not subject to the errors heretofore complained of.

Another object of the invention is to provide a device of the character described provided with a plurality of rotating mirrors adapted to reflect a beam of light projected thereon from a source of light periodically upon an object under observation at relatively high frequency.

Another object of the invention is to provide a device of the character described having means for causing a circulation of cooling air throughout the interior thereof.

A further object of the invention is to provide a device of the character described the interior of which is coated with a non-light-reflecting material to prevent interference by transversely reflected light rays.

A still further object of the invention is to provide a device of the character described having a microscopic, telescopic attachment through which a moving object may be viewed at a distance.

Further objects will appear in the following specification and claims.

In the drawings,

Fig. 1 is a plan view of a stroboscopic device constructed in accordance with the present invention.

Fig. 2 is a vertical longitudinal section through the device taken on line 2—2 of Fig. 1.

Fig. 3 is a vertical longitudinal section taken on line 3—3 of Fig. 1.

Fig. 4 is a horizontal sectional view taken on line 4—4 of Fig. 3.

Referring to the drawings, the device is shown as comprising a housing 1 which is mounted upon a hollow base 2 and which is provided with a wall 3 at one end and a partition 4 adjacent to the other end thereof. A casing 5 is secured to the housing 1 and encloses a high speed electric motor 6 of the universal type the armature shaft 7 of which is mounted in bearings 8 and 9 provided in the casing 5 and the partition 4 respectively. The shaft 7 extends into the housing 1 and carries a cylindrical bearing member 10 upon which the cylindrical hub 11 of a friction disk 12 is mounted for axial sliding movement. The hub 11 is slidably keyed to the member 10 by means of a pin 13 which is carried by the member 10 and which projects through a slot 14 provided in the hub 11. The disk 12 is adapted to frictionally engage a wheel 15 which is keyed for sliding movement upon a vertically extending shaft 16 and is yieldably urged into contact therewith by means of a coil spring 17 interposed between the bearing member 10 and the wheel 12. The shaft 16 is mounted in bearings 18 and 19 provided in the upper and lower walls of the housing 1. The wheel 15 is adjusted vertically along the shaft 16 and toward and away from the axis of the disk 12 by means of a yoke 20 which is threaded onto a vertically extending screw 21 for engagement with a peripheral groove 22 provided in a hub 23 of the wheel 15. The screw 21 is journalled at its upper and lower ends in bearings 24 and 25 carried by the housing 1 and may be rotated in either direction in order to raise and lower the yoke 20 by means of a thumb wheel 26 which is fixed thereto adjacent to its lower end, and a portion of which projects through a slot 27 formed in the end wall 3 for engagement by the thumb of the operator.

A housing 28 is mounted upon the upper portion of the housing 1 and encloses a plurality of light-reflecting mirrors 29 which are fixed back to back upon the upper end of the shaft 16. The forward end of the housing 28 is formed with a cylindrical reduced portion 30 upon which a tubular housing 31 is removably secured.

Lens holders 32 and 33 are slidably mounted in the housing 31 adjacent to each end thereof and carry plano-convexo lenses 34 and 35. The holders 32 and 33 may be adjusted toward and away from each other so as to obtain the proper focus of the lenses and secured in position by means of set screws 36 and 37 which are threaded into the holders and which project through slots 38 and 39 provided in the housing 31.

A holder 40 is also slidably mounted in the housing 31 between the lenses 34 and 35 and carries a diaphragm 41 which is provided with a central opening 42 and is adapted to intercept all light rays passing through the lens 34 except those that intersect at the focal point. The holder 40 and diaphragm may be adjusted axially of the housing 31 in order to locate the opening 42 accurately with respect to the focal point of the rays passing through the lens 34 and secured in adjusted position by means of a set screw 43 which is threaded into the holder 40 and which extends through a slot 44 provided in the housing 31.

The interiors of the mirror housing 28 and the lens housing 31 are preferably blackened with a non-light-reflecting paint, such as shellac having a high content of lamp black, which gives a dull finish and prevents undesired reflection of the light rays passing through the lens 34.

An electric lamp 45 is mounted in a socket 46 carried by an extension 47 of the base 2 and is enclosed by a vertically extending tubular housing 48 (Fig. 3). The upper portion of the housing 48 is provided with a slip cover 49 which is provided with a central opening 50 through which heat generated by the lamp may escape. The opening 50 is closed to light rays by means of a disk 51 which is secured to lugs 52 in spaced relation to the walls of the cover 49 and around which heat may escape.

Heated air is expelled from the interior of the lamp housing 48 by means of a fan 53 which is mounted on the armature 7 and which draws cool air from the outer atmosphere through apertures 54 provided in the wall 3 and forces it through ports 55 in the base 2 and thence through ports 56 in the extension 47 thereof into the lamp housing 48 from which it escapes through the opening 50 in the cover 49.

A reflector 57 is adjustably mounted at one side of the lamp 45 and in line with the beam projected by the lamp and may be adjusted by means of a plurality of screws 58 which extend through a reflector housing 59 secured to the lamp housing 48. A cap 60 is threaded onto the housing 59 and encloses the ends of the adjusting screws 58.

A beam of light projected from the lamp 45 passes through an opening 61 formed in the housing 48 and through a tubular portion 62 of the housing 28 and against the mirrors 29 as they rotate and is reflected thereby upon 180° of rotation of the shaft 16 through the lenses 34 and 35 and upon the object being examined. The frequency of this intermittent projection of the beam of light through the lenses may be varied according to the rapidity of movement of the object under observation by increasing or decreasing the speed of rotation of the mirrors 29 which is readily accomplished by means of the adjusting screw 24. The speed of rotation of the mirrors 29 is thus regulated until the object being viewed apparently becomes stationary, or at least moving forwardly or backwardly at a sufficently slow rate to permit of its examination.

The number of mirrors or reflecting surfaces employed is of course optional according to requirements. For example, if the shaft is rotated at a rate of 18,000 R. P. M. one mirror will cause the light beam to be projected upon the object under examination eighteen thousand times a minute. If two mirrors are employed this frequency of projection is doubled, etc. Therefore, the number of mirrors employed is determined by the frequency of movement of the object. Obviously, the more mirrors employed the greater the frequency of projection of the light beam at a given speed of the shaft 16. This will also permit of the examination of an object at a much slower rotary speed of the mirrors.

A suitable tachometer 63 is preferably mounted on the upper portion of the housing 28 and connected directly to the shaft 16 and by means of which the speed of the object under observation may be readily determined.

In order to facilitate the observation of a remote object, such as a shaft or other moving part of a machine not readily accessible, the apparatus is preferably equipped with a microscopic, telescopic device 64 which is mounted on the casing 28 adjacent to the tachometer 63 by means of an adjustable swivel attachment 65.

In operation the operator directs the beam of light projected through the lenses 34 and 35 upon the object under examination, a rapidly rotating gear wheel for example, and the speed of rotation of the mirrors 29 then adjusted by means of the thumb wheel 24 until the object appears to become stationary. When this condition prevails it signifies that the mirror is rotating in synchronism with the gear or that a beam of light is being projected at the same portion of the gear upon every rotation thereof. The rotations per minute of the gear may then be accurately determined from the tachometer 63. Under such conditions, the gear may be examined for flaws or defects and it may be made to appear to rotate slowly backwards and forwards so as to examine all portions of its periphery or all of its teeth, by simply increasing or decreasing the speed of rotation of the mirrors 29.

From the foregoing it will be apparent that a very rugged and efficient device is provided which will quickly and accurately indicate the cyclic frequency of an object or flaws or defects existing therein and one in which the inaccuracies and other objections heretofore encountered are eliminated.

The illustrated embodiment of the invention may be modified in construction and arrangement without departing from the scope of the invention, as defined in the appended claims.

What is claimed is:

1. A stroboscopic apparatus for examining rapidly moving objects comprising a movable reflecting member, means for directing a beam of light against said member, means for focusing and directing the beam reflected by said member against the object to be observed, means for moving said member to cause periodic interruptions in the beam reflected thereby, and means for varying the frequency of movement of said member to correspond to the cyclic frequency of said object.

2. A stroboscopic apparatus for examining rapidly moving objects comprising a rotatable reflecting member, means for directing a beam of light against said member, means for focusing and directing the beam reflected by said member against the object to be observed, means for rotating said member to cause periodic interruptions in the beam reflected thereby, and means for varying the speed of rotation of said member to correspond to the cyclic frequency of said object.

3. A stroboscopic apparatus for examining rapidly moving objects comprising a rotatable mirror, means for directing a beam of light against said mirror, a plurality of lenses for directing the beam reflected by said mirror against the object to be observed, means for rotating said mirror to cause periodic interruptions in the beam reflected thereby, means for varying the speed of rotation of said member to correspond to the cyclic frequency of said object, and means for adjusting the focus of said lenses.

4. A stroboscopic apparatus for examining rapidly moving objects and for indicating the cyclic frequency thereof comprising a movable reflecting member, means for directing a beam of light against said member, means for focusing and directing the beam reflected by said member against the object to be observed, means for moving said member to cause periodic interruptions in the beam reflected thereby, means for varying the frequency of movement of said member to correspond to the cyclic frequency of said object, and means operating in synchronism with said reflecting member for indicating the cyclic frequency of said object.

5. A stroboscopic apparatus for examining rapidly moving objects and for indicating the cyclic frequency thereof comprising a movable reflecting member, means for directing a beam of light against said member, means for focusing and directing the beam reflected by said member against the object to be observed, means for moving said member to cause periodic interruption in the beam reflected thereby, means for varying the frequency of movement of said member to correspond to the cyclic frequency of said object, and means driven by said reflecting member for indicating the cyclic frequency of said object.

6. A stroboscopic apparatus for examining rapidly moving objects and for indicating the cyclic frequency thereof comprising a movable reflecting member, means for directing a beam of light against said member, means for focusing and directing the beam reflected by said member against the object to be observed, means for moving said member to cause periodic interruption in the beam reflected thereby, means for varying the frequency of movement of said member to correspond to the cyclic frequency of said object, and a meter driven by and operating in synchronism with said reflecting member for indicating the cyclic frequency of said object.

7. A stroboscopic apparatus for examining rapidly moving objects and for indicating the cyclic frequency thereof comprising a rotatable deflecting member, means for directing a beam of light against said member, means for focusing and directing the beam reflected by said member against the object to be observed, means for rotating said member to cause periodic interruptions in the beam reflected thereby, means for varying the speed of rotation of said member to correspond to the cyclic frequency of said object, and a means operating in synchronism with said reflecting member for indicating the cyclic frequency of said object.

8. A stroboscopic apparatus for examining rapidly moving objects and for indicating the cyclic frequency thereof comprising a rotatable reflecting member, means for directing a beam of light against said member, means for focusing and directing the beam reflected by said member against the object to be observed, means for rotating said member to cause periodic interruption in the beam reflected thereby, means for varying the speed of rotation of said member to correspond to the cyclic frequency of said object, and a meter driven by and operating in synchronism with said reflecting member for indicating the cyclic frequency of said object.

9. A stroboscopic apparatus for examining rapidly moving objects comprising a plurality of rotatable reflecting members disposed at different angles relative to the axis of rotation thereof, means for directing a beam of light against said members, means for focusing and directing the beam deflected by said members against the object to be observed, means for moving said members to cause periodic interruptions in the beam reflected thereby, and means for varying the frequency of movement of said members to correspond to the cyclic frequency of said object.

10. A stroboscopic apparatus for examining rapidly moving objects comprising a housing, a reflector mounted in said housing, a lamp, a housing therefor, a casing, lenses mounted in said casing for directing a beam of light reflected therethrough by said reflector upon an object to be examined, and a motor for actuating said reflector to intermittently interrupt the beam reflected thereby, the interiors of said reflector housing and said lens casing having a non-light-reflecting surface.

11. A stroboscopic apparatus for examining rapidly moving objects comprising a housing, a reflector mounted in said housing, a lamp, a housing therefor, a casing, lenses mounted in said casing for directing a beam of light reflected therethrough by said reflector upon an object, a motor for actuating said reflector to intermittently interrupt the beam reflected thereby, and means driven by said motor for causing a circulation of cooling air through said lamp housing.

12. A stroboscopic device comprising a rotating element provided with a plurality of reflecting surfaces, a casing surrounding said element having two apertures, each of said reflecting surfaces being adapted to reflect a beam of light passing through one of said apertures through the other of said apertures, whereby each rotation of said element will interrupt a beam of light reflected through one of said apertures a number of times corresponding to the number of reflecting surfaces of said element.

13. In a stroboscopic apparatus, a lamp, a reflector, a motor, drive means connecting said reflector and motor, a casing having a reflector housing, a chamber for said drive means, a lamp chamber communicating with said reflector housing, air passages between said chamber for said drive means and said lamp chamber, and means associated with said drive means for circulating air through said chambers and passages, whereby excessive heat from the lamp will not be conducted to said reflector.

14. Stroboscopic apparatus for observing a moving object by periodically projecting a beam of light upon such object to be observed, comprising a reflecting member, means for directing a beam of light upon said reflecting member, means for effecting angular movement of said reflecting member, whereby an angularly moving beam of reflected light is produced, and a casing enclosing said member, said casing having a single aperture in the path of said moving beam of reflected light and in line with said reflecting member and the object to be observed for passing light from the casing to the object, said reflecting member and the portions of the casing about the aperture cooperating to periodically interrupt a beam of light reflected from the reflecting member through the aperture whereby a light beam will be intermittently projected upon the object to be observed.

15. Stroboscopic apparatus for observing a moving object by periodically projecting a beam of light upon such object to be observed, comprising a reflecting member, means for directing a beam of light upon said reflecting member, means for rotating said reflecting member, whereby an angularly moving beam of reflected light is produced, and a casing enclosing said member, said casing having a single aperture in the path of said moving beam of reflected light and in line with said reflecting member and the object to be observed for passing light from the casing to the object, said reflecting member and the portions of the casing about the aperture cooperating to periodically interrupt a beam of light reflected from the reflecting member through the aperture whereby a light beam will be intermittently projected upon the object to be observed.

16. In a stroboscopic apparatus, a movable reflecting member, means for effecting angular movement of said member, a casing having an aperture in line with said member, said casing having a second aperture in another line with said member but angularly related to said first line, and focusing means effective between said second aperture and said member for focusing substantially to a point at said second aperture a light beam reflected by said movable member through said second aperture, whereby a beam of light passing through said first mentioned aperture will be periodically reflected by the movable member through the second aperture.

EDWARD A. BUTLER.